(12) United States Patent
Bohannon, Jr.

(10) Patent No.: US 6,855,650 B1
(45) Date of Patent: Feb. 15, 2005

(54) SYNTHETIC FIBER FILLED EROSION CONTROL BLANKET

(75) Inventor: Gerald Davis Bohannon, Jr., Lake Wylie, SC (US)

(73) Assignee: American Excelsior Company, Arlington, TX (US)

( * ) Notice: Subject to any disclaimer, the term of this patent is extended or adjusted under 35 U.S.C. 154(b) by 97 days.

(21) Appl. No.: 09/648,906

(22) Filed: Aug. 25, 2000

(51) Int. Cl.⁷ ............................. B32B 5/26; E02D 17/20
(52) U.S. Cl. .................. 442/32; 442/49; 442/189; 442/334; 442/335; 442/352; 442/359; 428/369; 405/15; 405/258.1; 405/263; 405/302.4; 405/302.6; 405/302.7; 264/911; 264/913; 264/918; 264/920
(58) Field of Search .................. 428/297.4, 298.4, 428/369; 442/32, 49, 189, 334, 335, 352, 359; 405/15, 258.1, 263, 302.4, 302.6, 302.7; 264/911, 913, 918, 920

(56) References Cited

U.S. PATENT DOCUMENTS

| | | | |
|---|---|---|---|
| 4,342,807 A | 8/1982 | Rasen et al. ............... 428/180 |
| 5,207,020 A | 5/1993 | Aslam et al. ................. 47/9 |
| 5,330,828 A | 7/1994 | Jacobsen, Jr. et al. ...... 428/286 |
| 5,358,356 A * | 10/1994 | Romanek et al. ............ 405/16 |
| 5,459,181 A | 10/1995 | West et al. ................. 524/35 |
| 5,484,501 A | 1/1996 | Jacobsen, Jr. et al. ...... 156/209 |
| 5,507,845 A * | 4/1996 | Molnar et al. ............... 47/1.01 |
| 5,605,721 A * | 2/1997 | Di Geronimo ............... 427/373 |
| 5,651,641 A | 7/1997 | Stephens et al. ............ 405/258 |
| 5,741,832 A | 4/1998 | Spittle ........................ 523/132 |
| 5,779,782 A | 7/1998 | Spittle ....................... 106/164.3 |
| 5,786,281 A | 7/1998 | Prunty et al. ............... 442/104 |
| 5,789,477 A * | 8/1998 | Nosker et al. .............. 524/494 |
| 5,849,645 A | 12/1998 | Lancaster ...................... 442/5 |
| 5,942,029 A | 8/1999 | Spittle ....................... 106/164.3 |
| 6,156,682 A * | 12/2000 | Fletemier et al. ........... 442/394 |
| 2003/0166372 A1 * | 9/2003 | Thomas ...................... 442/401 |

* cited by examiner

Primary Examiner—Ula Ruddock
(74) Attorney, Agent, or Firm—Jenkens & Gilchrist, P.C.

(57) ABSTRACT

A durable erosion control blanket featuring a novel synthetic fiber filler is disclosed. The erosion control blanket of the present invention addresses the need for a particularly resilient erosion control blanket through the use of a post-consumer, crimped, polyester fiber filler material. In one embodiment, the post-consumer fiber material is of polyethyleneterephthalate (PET) readily available in post-consumer form from the recycling of soda bottles. In short, a preferred filler material for the blanket of the present invention would utilize recycled soda bottle material which has been converted into a crimped, highly-resilient fibrous filler. It is, thus, possible to achieve the desired physical and mechanical properties in the erosion control blanket of the present invention while conserving natural resources to some extent by using a readily available post-consumer polymer material.

6 Claims, 3 Drawing Sheets

SYNTHETIC FIBER FILLED EROSION CONTROL BLANKET

BACKGROUND OF THE INVENTION

1. Technical Field of the Invention

The present invention relates to erosion control blankets and, more particularly, to a soil erosion control blanket having a synthetic, fibrous filler material which is substantially non-biodegradable. The erosion control blanket of the present invention is designed to prevent soil erosion and runoff, as well as permitting the in-growth of grasses and other vegetation, while retaining a near original state and not degrading significantly over a number of years.

2. History of the Related Art

Erosion control blankets have established commercial acceptance and use worldwide. Erosion control blankets are articles which resemble a form of fibrous matting in which two outer layers of netting or other material are commonly used to form an envelope or covering about a fibrous interior filler layer. These blankets are commonly used to reduce soil erosion and runoff from erosion-prone areas such as highway embankments or water drainage ditches.

Several different styles of erosion control blankets or mats are commonly in use today. One particular style of blanket that does not use a netting material is set forth and shown in U.S. Pat. No. 5,786,281 which is assigned to the assignee of the present invention and incorporated herein by reference. Other styles may include at least two outer netting or facing layers that are filled with a loose fibrous material. For example, one particularly effective erosion control blanket is the CURLEX or excelsior fiber blanket manufactured and sold by the American Excelsior Company of Arlington, Tex. since 1964. This blanket is fabricated in elongated rectangular mat form, from elongated, randomly intertwined wood fibers commonly referred to as excelsior. Prior art erosion control blankets and mats such as these are commonly used in conjunction with commercial or residential construction projects in an attempt to control soil loss and runoff into adjoining areas. The blankets are unrolled along the earth area to be protected against erosion, and are secured along the sides of one another and to the underlying ground area with a series of conventional ground staple members. The ground staple members may be made of steel, wood, plastic or other materials and serve to anchor the mats securely to the covered earth area. Additionally, in some applications, erosion control blankets or mats such as these may be rolled to form a sort of artificial curb or barrier at the edge of a property or construction site.

The netting and loose fiber filler construction permits blankets or mats of this kind to be fairly light in weight and also to permit the ingrowth of grasses and other vegetation into and through the blanket. The netting primarily serves to hold the loose fiber filler together while providing a large number of openings for plant ingrowth. As these blankets will frequently become a fixture in their installment site, it is often desirable to form the inner fibrous layer of the blanket of various types of biodegradable materials. By way of example, recycled paper or fiberized waste paper, wood fibers or excelsior, straw or other naturally fibrous materials such as coconut husks may be used to provide a biodegradable filler material. However, in some erosion-prone areas such as water runoff ditches and the like, it is particularly useful to have an erosion control blanket or mat with a more substantial and permanent filling which will not significantly degrade over long periods of time.

One solution to the problem referenced above is the use of polymeric or other synthetic fibers as filler materials. Some synthetic filler materials which have been suggested include polyethylene, polypropylene or nylon fibers and blends of fibers such as these with organic or biodegradable fibers such as those noted above. Several shortcomings have been noted by end users with these blankets which include synthetic fibers in that the blankets tend to become matted down or thinner over time and tend to lose their loft or three-dimensionality. As blankets become matted down, the fibers in the filler tend to become more tightly packed, and the subsequent in-growth of grasses and other vegetation becomes increasingly difficult. Prior art attempts to resolve fiber matting problems have involved the use of multiple netting layers disposed throughout the filler material and netting which is corrugated or shaped to hold a more three-dimensional structure. However, these solutions may involve significant additional material and labor costs to produce an erosion control blanket. Moreover, synthetic/organic blended fillers tend to degrade over time much like organic-only fillers, and merely do so at a slower rate. Thus, while synthetic-only fillers for erosion control blankets have been suggested, these appear to be somewhat wasteful of natural resources and still suffer from shortcomings in the areas of fiber resiliency and loft.

SUMMARY OF THE INVENTION

The present invention overcomes the shortcoming of the existing designs and satisfies a significant need for a durable erosion control blanket with improved loft and resiliency properties. More specifically, the erosion control blanket of the present invention addresses the need for an erosion control blanket which does not significantly degrade over a number of years and maintains a high degree of resiliency or loft when in use. In one embodiment of the present invention, the erosion control blanket has at least three layers including a top sheet, a filler material and a bottom sheet. The top and bottom sheets generally resemble an open-mesh material or netting. Many of the particular physical characteristics of the erosion control blanket are achieved through the use of a novel synthetic fiber filler material. The filler material for use in the erosion control blanket is a made up of a plurality of crimped polymer fibers which form a three-dimensional matrix between the top sheet and the bottom sheet. Moreover, it is possible to form the crimped polymer fibers from post-consumer polyester fiber material such as polyethylene terephthalate (PET). Although it is to be understood that the synthetic filler is not limited to this particular material, PET is desirable in that it is commonly used to make soda bottles and other translucent packaging containers, and is consequently readily available in post-consumer form. Thus, it is possible to achieve the desired physical and mechanical properties in the erosion control blanket of the present invention while conserving natural resources to some extent by using a readily available post-consumer polymer material.

BRIEF DESCRIPTION OF THE DRAWINGS

A more complete understanding of the erosion control blanket according to the present invention may be obtained by reference to the following detailed description when taken in conjunction with the accompanying drawings wherein.

DETAILED DESCRIPTION OF THE PREFERRED EMBODIMENTS

The present invention will now be described more fully hereinafter with reference to the accompanying drawings in which several preferred embodiments of the invention are shown. This invention may, however, be embodied in many different forms and should not be construed as being limited to the embodiments set forth herein. Rather, the embodiments are provided so that this disclosure is thorough and complete, and fully conveys the scope of the invention to those skilled in the art.

Figure 1:
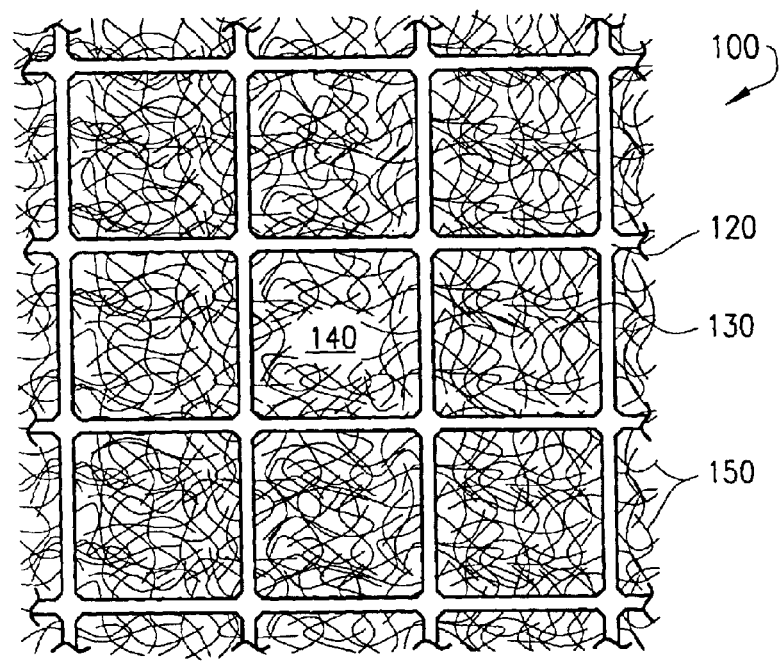
FIG. 1 is a top plan view of a section of an erosion control blanket constructed in accordance with the present invention.
Figure 2:
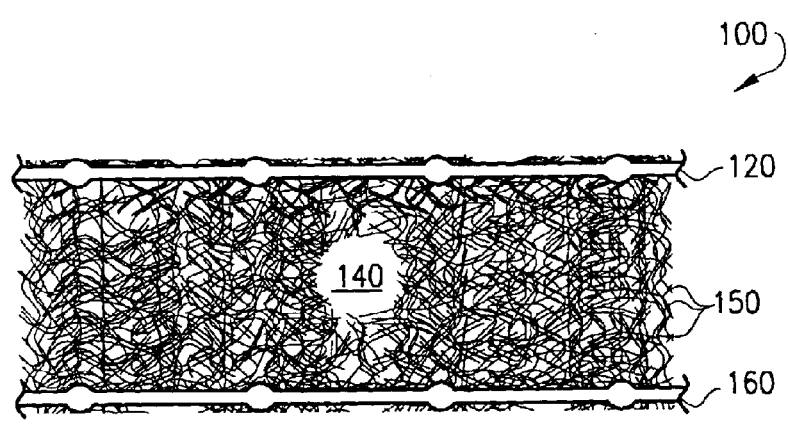
FIG. 2 is a cut-away side view of a section of an erosion control blanket constructed in accordance with the present invention.
Figure 3:
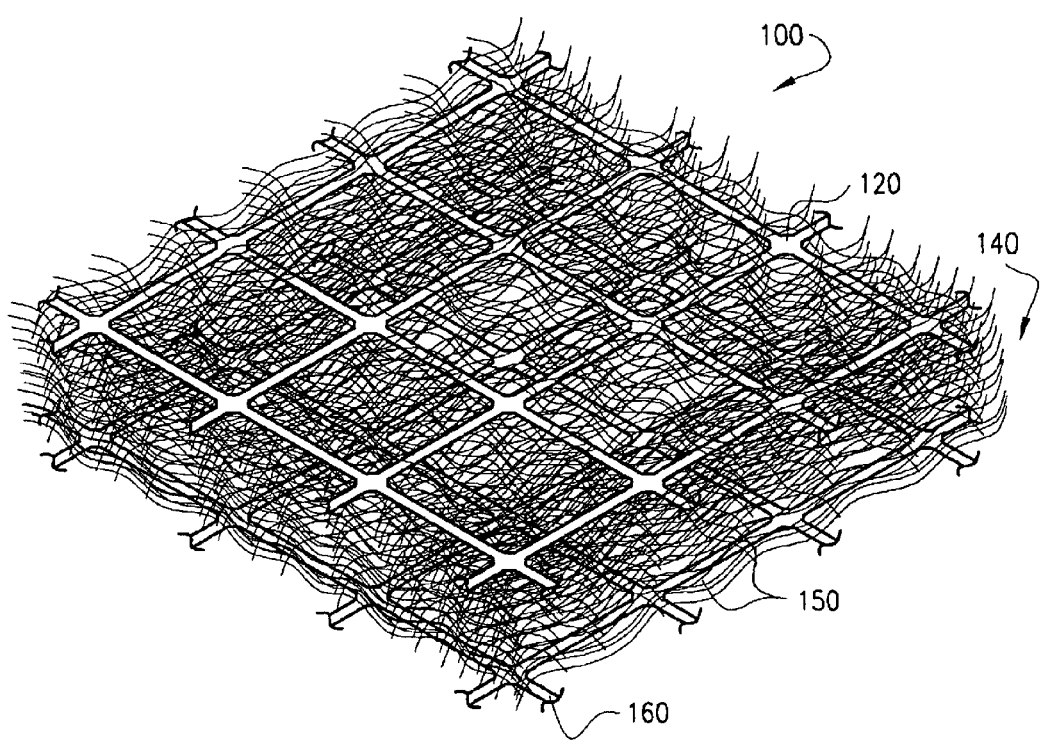
FIG. 3 is a top perspective view of a section of an erosion control blanket constructed in accordance with the present invention.

Referring now to FIGS. 1-3, a section of an erosion control blanket 100 constructed in accordance with the principles of the present invention is set forth and described. Note that each of the drawings have been numbered with like numbers corresponding to like parts. As best seen in FIG. 2, the erosion control blanket 100 is formed of three layers of material. The first layer is a top sheet 120 of an open-meshed material of natural or synthetic fibers. The second layer is of a loose fiber filler 140 which is arranged to form a three-dimensional matrix and provides the erosion control blanket with a required amount of loft or resiliency. The third layer is a bottom sheet 160 or open-meshed material which generally resembles the top sheet 120 or first layer in construction.

Referring now to FIG. 1, the top sheet 120 is seen to have a open-meshed material or netting with a high percentage of open area. In one embodiment of the present invention, the openings 130 in this netting material are rectangular in shape with sides ranging form about 0.50 inches to about 1.00 inches in length. The netting itself may be formed of either natural or synthetic materials, and in one preferred embodiment, is of polyethylene (PE), polypropylene (PP), or other suitable polyolefin. It is particularly desirable to make the top sheet 120 or netting of a synthetic material which is both lightweight, strong, and durable enough to resist tearing or rupture of the soil erosion control blanket 100. The netting material may also include various additives, as known in the art, to improve resistance to ultraviolet (UV) radiation or to impart a particular color. By way of example only, a small amount of carbon black additive, about 0.1% to about 2.5% by weight, may be incorporated into a suitable polymer to impart both a black color and a significant amount of UV resistance into the netting material.

Although not shown in FIG. 1, the bottom sheet 160 or netting of the erosion control blanket 100 in accordance with the present invention is substantially similar in construction to the top sheet 120 as shown and described. That is, the bottom sheet 160 will also have an open-meshed material with a high degree of open area and be made of very similar materials to that of the top sheet 120.

Still referring to FIGS. 1-3, in another embodiment of the present invention, the top sheet 120 and the bottom sheet 160 may be constructed of polymer materials having slightly different mechanical properties. For example, as the top sheet 120 will be exposed to more direct sunlight and UV radiation than the bottom sheet, it may be desirable to use a top sheet 120 which is stronger and heavier than the bottom sheet 160. In one preferred embodiment, the top sheet 120 is formed of 600 denier, high-tensile, polypropylene material and has a weight of about 10.0 pounds/1000 square feet and a strand count of about 9.0 and about 13.0 strands/10 inches in the machine and transverse directions, respectively. The netting has rectangular openings with sides of about 0.75 inches to about 1.00 inches in length. The top sheet 120 has a break load of about 57.0 pounds/3 inches in the machine direction and about 73.0 pounds/3 inches in the transverse direction. However, in this particular embodiment, the bottom sheet 160 is formed of 600 denier, high-tensile, polypropylene material and has a weight of about 2.87 pounds/1000 square feet and a strand count of about 13.0 to about 14.0 strands/10 inches in both the machine and transverse directions. The netting has rectangular openings with sides of about 0.70 inches to about 0.80 inches in length. The bottom sheet 160 has a break load of about 29.0 pounds/3 inches in the machine direction and about 23.4 pounds/3 inches in the transverse direction.

The filler material 140 of the erosion control blanket 100 of the present invention is an arrangement of crimped polymer fibers 150 to create a three-dimensional matrix having a desired amount of loft and resiliency. Although the polymer fibers 150 may be arranged in various ways, a randomly dispersed loose fiber fill will generally produce a blanket with sufficient loft. In one embodiment of the present invention, the polymer fibers 150 are formed of a post-consumer polyester, namely polyethylene terephthalate (PET). This particular material is commonly used to form soda bottles and other translucent packaging containers, and is readily available in post-consumer form. By way of example only, it is also possible to purchase post-consumer PET which is of a particular color, namely green, which is derived from SPRITE, 7-UP, and other citrus flavored soda bottles. The green-colored, post-consumer PET material is desirable in some applications as it provides the resulting erosion control blanket with a visually attractive green color which tends to blend in with grass and plants.

This post-consumer polyester resin may be recycled into fibers 150 to form the filler material 140 of the blanket 100 according to the present invention. These PET fibers 150 offer a high degree of loft when crimped and tend to be more resilient than other synthetic fibers. In accordance with the present invention, the PET fibers will have a denier size of about 15 to about 500. It is the inventor's belief that the post-consumer PET fibers used in the filler of the erosion control blanket of the present invention are unique in that this particular fiber has a particularly good shape memory. That is, that when a blanket 100 filled with crimped PET fiber materials is compressed and the load is subsequently removed, the crimped fibers 150 and consequently the blanket 100 will tend to spring back to its nearly all of its original dimension. Additionally, the crimped fibers 150 will tend to entangle and cling one-to-another more aggressively than uncrimped fibers do. This particular feature of crimped fibers serves to reduce the migration of fibers out of the blanket and further assures consistent blanket loft with the passage of time. Thus, it is possible to create a erosion control blanket 100 which has a higher degree of loft and is far more resilient than prior art loose fiber filler erosion control blankets.

The recycled polyester fibers 150 used as filler material in the erosion control blanket 100 of the present invention possess a unique combination of mechanical properties. It is notable that the post-consumer PET fibers have a specific gravity greater than 1.0, and do not float in water. However, many other synthetic fibers such as polyethylene, polypropylene and the like have specific gravities of less than 1.0 and will tend to float in water. This is a particularly useful characteristic of the post-consumer PET fibers in that erosion control blankets made in accordance with the present invention may be utilized in high water runoff areas including water drainage channels. Accordingly, it is easier to keep an erosion control blanket in contact with the ground when the fibers which fill the blanket do not float under hydraulic conditions. If an erosion control blanket tends to float, it will be much less effective at reducing soil loss and preventing the washing away of grass seed and other plant matter which is intended to grow through the erosion control blanket. The fiber material may also include various additives, as known in the art, to improve resistance to ultraviolet (UV) radiation or to impart a particular color.

In one embodiment, the post-consumer PET fibers will have denier size of about 15 to about 500, and have a preferred denier size of about 350 to about 450. The post-consumer PET fibers are then crimped using a stuffer-box crimper, not shown, as known in the art. In operation, the stuffer-box crimper receives a large number of semi-molten polymer fibers between a pair of smooth metal nip rolls and forces the fibers into a box or container having fixed dimensions and a variable resistance flapper device on the output opening. It is possible to increase the number of crimps per inch in the fibers by increasing the resistance of the flapper device of the output from the stuffer box. In short, greater resistance on the flapper device results in a higher number of crimps per inch on the fibers coming out of the stuffer-box. The post-consumer PET fiber 150 used in the present invention will normally have crimping in a range of about 1.0 to about 3.0 crimps per inch, with a value of 2.0 crimps per inch being preferred. The crimped PET fibers 150 are cut to lengths ranging from about 5.75 inches to about 6.25 inches, with a length of about 6.0 inches being preferred.

The post-consumer PET fibers 150 used in the present invention have been tested for resistance to compression. The testing procedure begins by first carding an 8.0 to 10.0 gram sample of fibers which are of 2.5 inches maximum length. The carded fibers are then weighed out into a 3.00±0.05 gram sample using an analytical balance. The 3.0 gram carded sample is then placed into the 3.0 inch diameter compression cup of an Instron resistance to compression tester. The compression cup is then sealed and air pressure applied to the fiber sample. The testing apparatus then computes a resistance to compression for the fiber sample in pounds. The crimped, post-consumer PET fibers used as a filler material in the present invention exhibited resistance to compression values ranging from about 4.5 pounds to about 6.0 pounds, with an average value of about 5.2 pounds. This value may also be converted into a resistance to compression value expressed pounds per square inch (psi) per gram of fiber. Thus, for a fiber sample with an average resistance to compression value of about 5.2 pounds, it is possible to calculate a value of about 0.245 psi/gram of fiber.

An additional measure of crimped PET fiber resiliency may be obtained by studying the ability of an amount of filler material to recover its original thickness after the application and removal of a particular load. In one such test, one (1.0) pound of crimped PET fiber loose filler is placed in a circular container having a 6.0 inch diameter and its thickness is measured. A compressive load of 0.5 psi is then applied evenly across the top surface of the loose filler for a period of 5.0 minutes. After the compressive load is removed, the thickness of the loose filler is measured again. A percent recovery is then computed by dividing the thickness after compression by the original thickness and multiplying by 100%. For the crimped, post-consumer PET fibers used as a filler material in the present invention, it was determined that the loose filler had a percent recovery value ranging from about 95% to about 97% of its original thickness.

Figure 4:
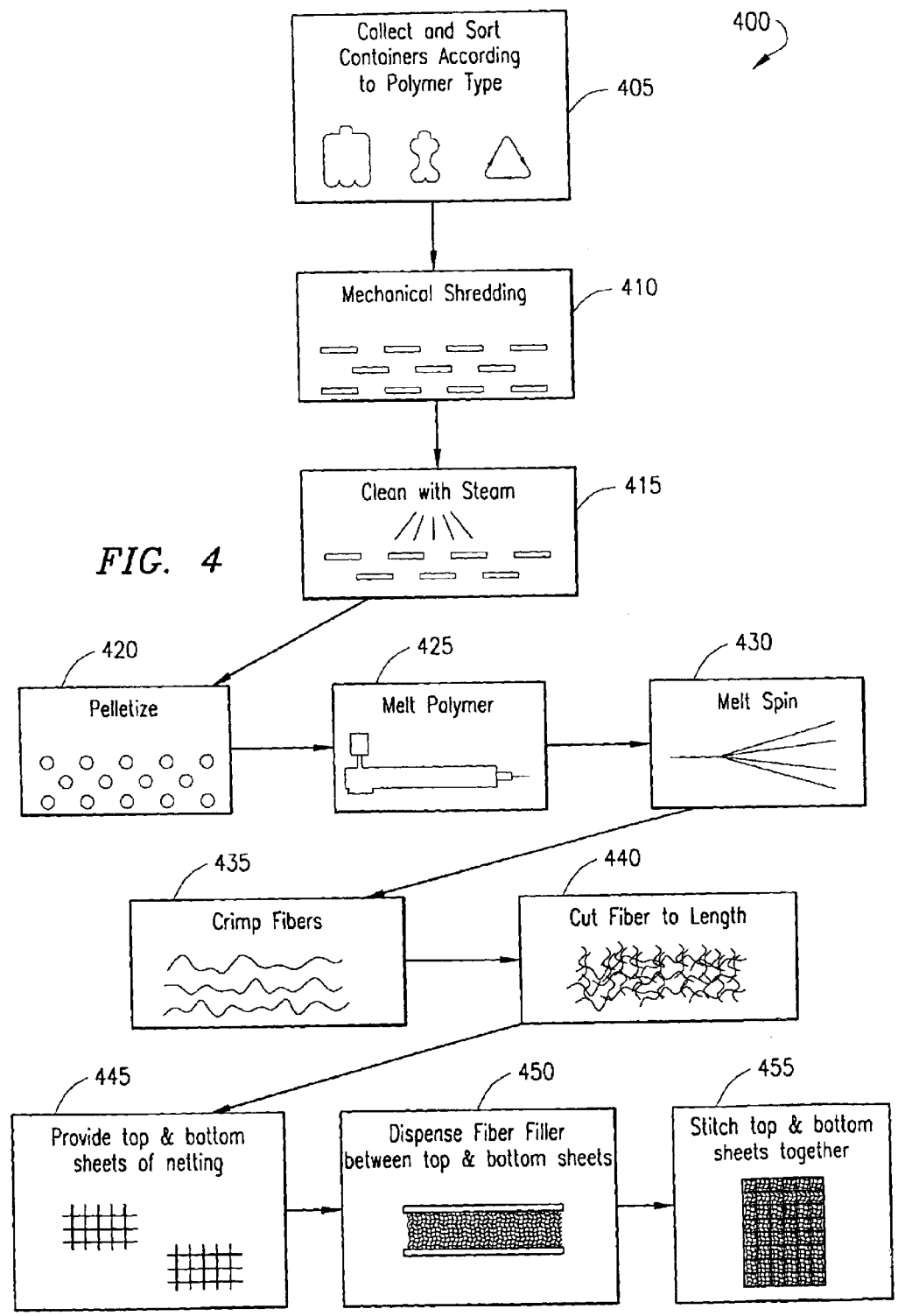
FIG. 4 is a block diagram of steps which are carried out to produce an erosion control blanket constructed in accordance with the present invention.

Referring now to FIG. 4, a block diagram illustrates, by way of example only, the various steps of a manufacturing process 400 which may be followed to construct an erosion control blanket in accordance with the present invention. In one embodiment, post-consumer plastic materials such as soda bottles and containers are collected and sorted 405 according to polymer types (e.g., polystyrene, polyethylene terephthalate, polybutylene terephthalate, polyethylene, polypropylene, and so forth). These containers are then mechanically shredded 410 and cleaned 415 with high temperature steam to produce post-consumer scrap polymer which is suitable for reprocessing. A fiber manufacturer may then purchase scrap polymer of a particular type, such as PET, pelletize 420 the scrap polymer, melt the polymer 425 in an extruder, and melt spin 430 fibers from the polymer. These fibers may then be crimped 435 using a stuffer-box crimper as described hereinabove and cut 440 to a particular length to produce a crimped loose fiber filler material. An erosion control blanket may then be produced by providing top and bottom sheets of netting material 445, randomly dispersing 450 the cut, crimped polymer fibers between the top and the bottom sheet, and then stitching 455 the top and bottom sheets together. Once the top and bottom sheets are fastened or stitched together and the loose fiberfill material is secured, it is possible to roll the generally rectangular blankets up into smaller, cylindrical bundles for shipping and handling.

It is thus believed that the operation and construction of the present invention will be apparent from the foregoing description of the preferred embodiments. While the erosion control blanket materials, configurations and designs as shown are described as being preferred, it will be obvious a person of ordinary skill in the art that various changes and modifications may be made therein without departing from the spirit and scope of the invention, as defined in the following claims. Therefore, the spirit and the scope of the appended claims should not be limited to the description of the preferred embodiments contained herein.

What is claimed is:

1. An erosion control blanket for controlling erosion and blending in with a surrounding area consisting of:

a top sheet of a netting material having a color which tends to blend in with the surrounding area;

a bottom sheet of a netting material;

a synthetic filler material being disposed between said top sheet and said bottom sheet;

wherein said synthetic filler material comprises a plurality of crimped polymer fibers, said crimped polymer fibers being arranged to form a three-dimensional matrix;

wherein said synthetic filler material comprises a substantially post-consumer recycled polyester having a color which tends to blend in with the surrounding area.

2. The erosion control blanket of claim 1, wherein said substantially post-consumer recycled polyester comprises post-consumer recycled polyethylene terephthalate (PET).

3. The erosion control blanket of claim 2, wherein said substantially post-consumer recycled polyethylene terephthalate (PET) comprises green soda bottle material.

4. The erosion control blanket of claim 1, wherein said synthetic filler material has a resistance to compression value of about 0.210 to about 0.285 psi/gram of fiber.

5. The erosion control blanket of claim 1, wherein said synthetic filler material has a percent recovery value of at least about 90% following application of a 0.5 psi compressive load for a period of 5.0 minutes.

6. The erosion control blanket of claim 1, wherein said crimped polymer fibers comprise additives to increase resistance to ultraviolet (UV) radiation.

* * * * *

UNITED STATES PATENT AND TRADEMARK OFFICE
CERTIFICATE OF CORRECTION

PATENT NO. : 6,855,650 B1
DATED : February 15, 2005
INVENTOR(S) : Gerald D. Bohannon, Jr.

It is certified that error appears in the above-identified patent and that said Letters Patent is hereby corrected as shown below:

Title page,
Item [57], ABSTRACT,
Lines 6-7, replace "polyethyleneterephthalate" with -- polyethylene terephthalate --.

Column 6,
Line 64, replace "fiberfill" with -- fiber fill --.

Signed and Sealed this

Fourteenth Day of March, 2006

JON W. DUDAS
*Director of the United States Patent and Trademark Office*